(12) United States Patent  
Stiehler et al.

(10) Patent No.: US 9,045,989 B2  
(45) Date of Patent: Jun. 2, 2015

(54) COUPLING ELEMENT FOR MECHANICALLY COUPLING BLADES AND A ROTOR

(75) Inventors: Frank Stiehler, Bad Liebenwerda (DE); Hans Peter Borufka, Starnberg (DE); Patrick Prokopczuk, Munich (DE)

(73) Assignee: MTU AERO ENGINES GMBH, Munich (DE)

( * ) Notice: Subject to any disclaimer, the term of this patent is extended or adjusted under 35 U.S.C. 154(b) by 456 days.

(21) Appl. No.: 13/508,842

(22) PCT Filed: Nov. 11, 2010

(86) PCT No.: PCT/DE2010/001320  
§ 371 (c)(1),  
(2), (4) Date: May 9, 2012

(87) PCT Pub. No.: WO2011/057613  
PCT Pub. Date: May 19, 2011

(65) Prior Publication Data  
US 2012/0224969 A1    Sep. 6, 2012

(30) Foreign Application Priority Data  
Nov. 13, 2009 (DE) .......................... 10 2009 052 883

(51) Int. Cl.  
*F01D 5/22*      (2006.01)  
*F01D 5/26*      (2006.01)

(52) U.S. Cl.  
CPC *F01D 5/225* (2013.01); *F01D 5/26* (2013.01); *F05D 2260/36* (2013.01); *Y02T 50/673* (2013.01); *F05D 2230/232* (2013.01)

(58) Field of Classification Search  
CPC ....... F01D 5/22; F01D 5/26; F05D 2250/183; F05D 2250/75  
USPC .................................. 416/191, 190, 194, 195  
See application file for complete search history.

(56) References Cited

U.S. PATENT DOCUMENTS

| 3,728,044 | A | * | 4/1973 | Fujita et al. | .................... 416/190 |
| 3,752,599 | A | * | 8/1973 | Pace | .............................. 416/190 |
| 5,154,581 | A | * | 10/1992 | Borufka et al. | ............... 416/190 |

FOREIGN PATENT DOCUMENTS

| DE | 2647630 A1 | 5/1977 |
| DE | 4015206 C1 | 10/1991 |
| DE | 10256778 A1 | 1/2004 |
| EP | 0511022 A1 | 10/1992 |
| EP | 1944466 A1 | 7/2008 |
| EP | 1992787 A1 | 11/2008 |

* cited by examiner

*Primary Examiner* — Nathaniel Wiehe  
*Assistant Examiner* — Michael Sehn  
(74) *Attorney, Agent, or Firm* — Barlow, Josephs & Holmes, Ltd.

(57) ABSTRACT

A coupling element 2, 52 is disclosed for arrangement between shrouds 14,16 of adjacent rotor blades 4, 6, the coupling element having force-transmission surfaces 28, 30 for bounding damping gaps 12a, 12b between shrouds 14, 16, and a rotor having at least one coupling element 2, 52 of this type.

23 Claims, 2 Drawing Sheets

COUPLING ELEMENT FOR MECHANICALLY COUPLING BLADES AND A ROTOR

Figure 1:
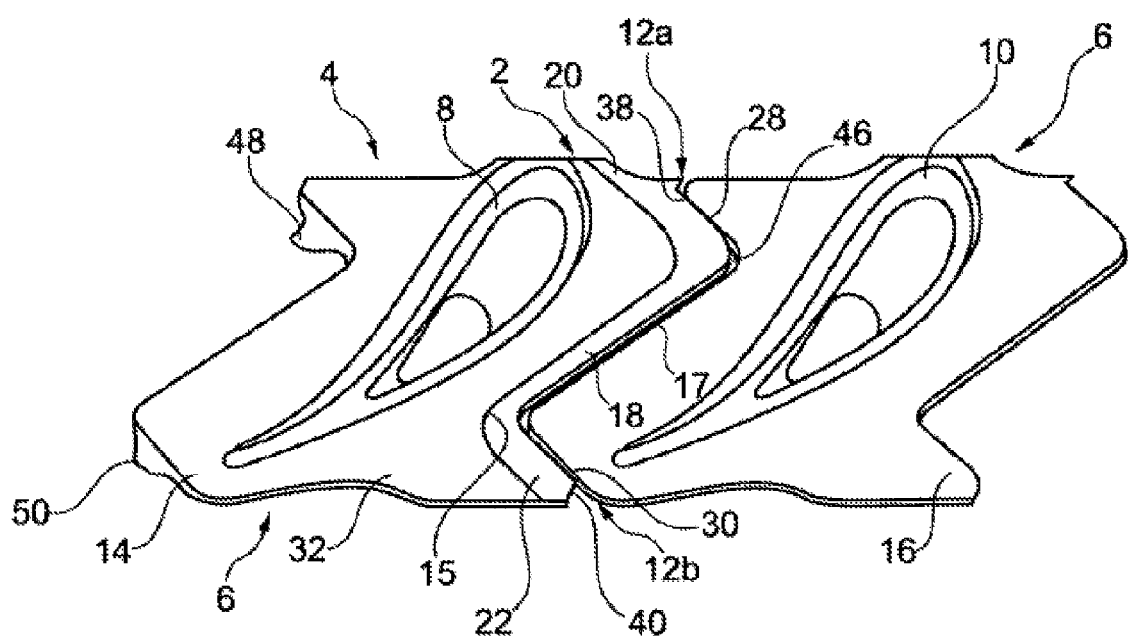

The invention relates to a coupling element for mechanically coupling blades according to the preamble of patent claim 1 and a rotor having at least one such coupling element according to the preamble of patent claim 10.

Rotor blades of gas turbines, in particular of aircraft engines, are usually clamped together inside a blade ring via their shrouds for damping vibrations. For this purpose, as shown in the patent DE 40 15 206 C1 of the Applicant, the shrouds frequently have a z-type configuration with two force-transmission surfaces each for reciprocal mechanical coupling. Such a mechanical coupling, in fact, is very effective, but the shrouds are subjected to a relatively high wear in the region of their force transmission surfaces.

In addition, it is known from EP 0 511 022 B1 to clamp the blades together via a wire-like coupling element, which is guided through the blade surfaces. This solution, however, in particular has the disadvantage that the wire-like coupling element is found in the flow path or annular channel. Further, the associated preliminary preparation of the blade surfaces and the changing of the coupling element are technically complicated. In particular, this solution cannot be provided, or is provided only under certain conditions, for inner-cooled blades.

It is known, for example, from European Patent Application EP 1 944 466 A1 to arrange coupling elements in pockets of opposite-lying shrouds. By rotating the rotor, the coupling elements are moved radially outward and will thus bring about a mechanical coupling of the shrouds. However, it is questionable whether a sufficient damping of vibrations can be achieved via the coupling produced in this way. Further, these coupling elements can be used only in the case of blades with associated pockets in the shrouds.

The problem of the present invention is to create a coupling element for mechanically coupling blades of a blade ring that eliminates the above-named disadvantages and permits a precise adjustment of damping gaps in the shroud region, and a rotor having at least one coupling element of this type.

This problem is solved by a coupling element with the features of patent claim 1 and by a rotor with the features of patent claim 10.

A coupling element according to the invention for mechanically coupling blades of a blade ring of a rotor can be positioned between the blade shrouds. According to the invention, there are force-transmission surfaces for bounding or defining damping gaps between the shrouds.

The coupling element according to the invention makes it possible for the shrouds not to be found directly in contact with one another, but they can be clamped securely with one another. The shrouds are distanced somewhat from one another, so that they cannot damage each other. The coupling element can be designed as a cost-effective wearing part, the service life of the shrouds being lengthened correspondingly. The element can be used for subsequent clamping or for the repair of blade rings without having to undertake complicated preparatory measures on the blades or their shrouds. Correspondingly, the coupling element according to the invention is suitable for the replacement-part or service business. Additionally, such coupling elements may also be used for adjusting the gap or for post-twist correction. Further, the coupling element can be used for all gap geometries, such as, for example, for linear gaps, Z-type gaps or for double Z-type gaps. In this way, the geometry of the coupling element can be determined so that the degrees of freedom are influenced and the operating behavior of the respective blade ring is adjusted individually. Among other things, the coupling element makes possible a direct joining of blades for rotors in the blisk (bladed disk) or bling (bladed ring) design. The coupling element is preferably weight-neutral and its material can be adapted simply to the materials of the shrouds.

In the case of one example of embodiment, the force-transmission surfaces are formed on the ends. Unfavorable torsional stresses due to geometrical distortions are prevented from being introduced into the shrouds and thus into the blades in this way. In particular, in this case it may be advantageous if the coupling element has a body section with constricted material between its force-transfer surfaces.

In one example of embodiment, the coupling element, at least with one section, has a configuration that corresponds to the course of the sides of the shrouds lying opposite. In this way, the force-transmission surfaces can point in a common direction or can be aligned with one another in opposite directions depending on the geometry in each case.

Advantageously, in the inserted state, the coupling element essentially continues the annular spatial geometry of the flow channel. This causes a minimizing of flow losses between the adjacent blades in the shroud region.

Likewise, in the incorporated state, the coupling element can form an essentially uniform outer contour of the shrouds. The aerodynamic resistance, i.e., in particular the resistance between the contour of the outer shroud and the surrounding atmosphere is reduced in this way.

In one example of embodiment, the coupling element has a body segment for a form-fitting engagement with at least one of the shrouds. Form-fitting has the advantage that no additional equipment such as a welding apparatus is necessary for inserting the coupling element. Further, a structural transformation of the shrouds or of the coupling element, such as occurs, for example, in the case of welding cannot be produced.

The coupling element can be assembled in modular fashion from several individual components. The modular-type construction makes possible the production of a plurality of coupling elements with different geometries from a limited number of individual components.

A rotor according to the invention has at least one blade ring that has a plurality of blades, each of which is provided with a shroud at the tip. Further, it has coupling elements for clamping the blade ring, which, according to the invention, bound damping gaps between the shrouds via force-transmission surfaces.

In order to avoid wedging, it may be advantageous if the coupling elements in each case define a slot between the force-transmission surfaces of the shrouds.

In one example of embodiment, each of the coupling elements is joined cohesively with one of the shrouds. The cohesive fitting is produced, for example, via a welding method such as electron beam welding or laser beam welding. It can also be built up, however, by means of metal powder injection molding (MIM method or metal injection molding) on the respective shroud. A solid and reliable joining is achieved in this way between the coupling elements and the shrouds.

In another example of embodiment, the coupling elements are disposed in form-fitting manner between the shrouds. This permits the rapid insertion of coupling elements as well as the simple exchange of a damaged coupling element.

Various advantageous embodiment examples are the subject of the additional subclaims.

It should be mentioned that the invention is not limited to use in gas turbines, but also encompasses, for example, steam turbines and compressors, in particular.

Figure 2:
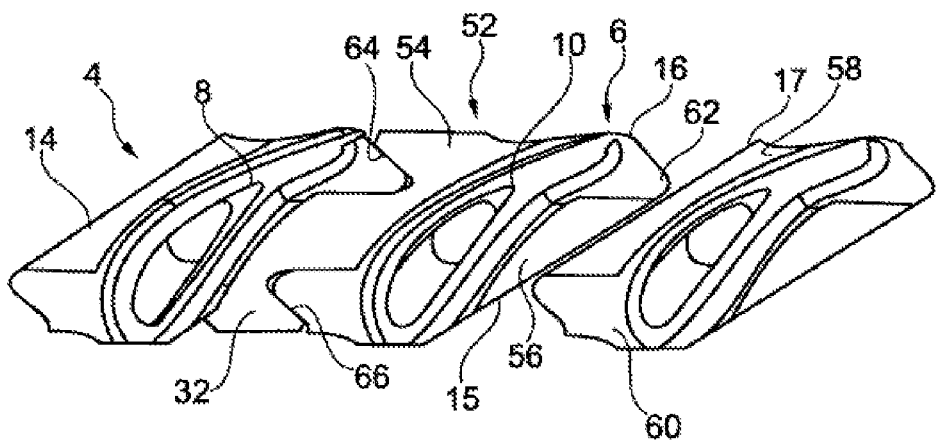
Figure 3:
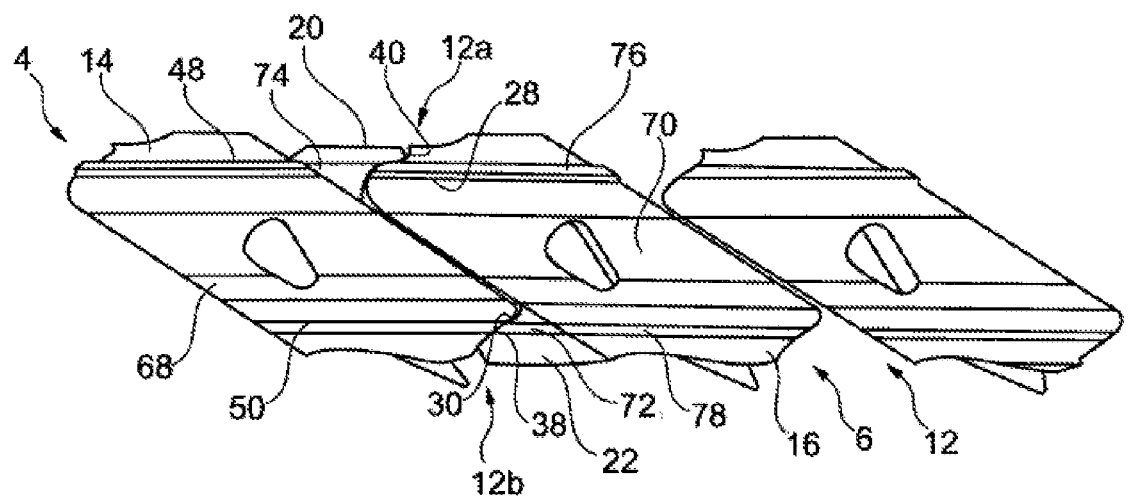

Preferred embodiment examples of the invention will be explained in more detail in the following on the basis of schematic representations. Here:

FIG. 1 shows a view radially from inside to outside onto a first example of embodiment according to the invention, FIG. 2 shows a view radially from inside to outside onto a second example of embodiment according to the invention, and FIG. 3 shows a view radially from outside to inside onto the second example of embodiment.

The same structural elements have the same reference numbers in the figures.

FIG. 1 shows a view radially from inside to outside onto a first coupling element 2 according to the invention for the reciprocal vibration damping of two adjacent blades 4, 6 and for clamping a blade ring formed by blades 4, 6 of a rotor, which is not shown. For purposes of clarity, blades 4, 6 were cut away in the region of their blade surfaces 8, 10. Blades 4, 6 are each provided on their tip ends with a shroud 14, 16, which has opposite-lying Z-type shroud sides 15, 17.

Coupling element 2 is composed of a metal base that is matched to the materials of shrouds 14, 16, and corresponding to shroud sides 15, 17, has a Z-type configuration with a crosspiece 18, and whose end sections 20, 22 are bent in opposite directions. It is joined, in particular welded, by its end segments 20, 22 and by its crosspiece 18 cohesively to the left shroud 14. Preferably, it has nearly the same or the same wall thickness as shrouds 14, 16.

The end sections 20, 22 each form a force-transmission surface 28, 30 facing the right shroud 16 and each bound a damping gap 12a, 12b between shrouds 14, 16. Damping gaps 12a, 12b are formed in particular between force-transmission surfaces 28, 30 of coupling element 2 and opposite-lying force-transmission surfaces 38, 40 of the right shroud 16. At least during operation, damping gaps 12a, 12b are closed by running the opposite-lying force-transmission surfaces 28, 30 or 38, 40 into one another, and thus shrouds 14, 16 or blades 4, 6 are clamped together.

Due to the Z-type configuration of shroud sides 15, 17 or of coupling element 2 and the arrangement of force-transmission surfaces 38, 40 on the end of shroud 16, each of force-transmission surfaces 38, 40 of shroud 16 and thus also force-transmission surfaces 28, 30 of coupling element 2 point in one direction.

Crosspiece 18 is formed with constricted material in comparison to end sections 20, 22 and thus is distanced from the right shroud 16. A narrow slot 46 between crosspiece 18 and the right shroud 16 and a nearly planar shroud inner surface 32 extending between blade surfaces 8, 10 is formed, so that the annular spatial geometry of the flow channel is continued via coupling element 2. Crosspiece 18 and end sections 20, 22, on their outer periphery, have a contour of this outer periphery, which is not shown in FIG. 1, whose course is adapted to the adjacent outer peripheral surfaces of shrouds 14, 16, so that essentially a consistent or integrated outer contour is formed (see FIG. 3). Accordingly, each of end sections 20, 22 has a wall-type raised piece, which produces a connection between the inlet-side or outlet-side sealing strips 48, 50, respectively, of shrouds 14, 16 and corresponds to these sealing strips 48, 50 in its configuration.

FIG. 2 shows a view radially from inside to outside onto a second coupling element 52 according to the invention, which is used for clamping shrouds 14, 16 at their tips with linear shroud sides 15, 17 of rotor blades 4, 6.

Coupling element 52 is composed of a metal base, which is matched to the materials of shrouds 14, 16, and is held by form-fitting between shrouds 14, 16, a section of the body, which is not shown, being provided for securing coupling element 52 in a stationary position of the rotor. It has a plate-shaped basic body 54, with which it can be brought into contact with inner peripheral surfaces 56, 58 of shrouds 14, 16, which are alternately adjacent to a V-shaped material thickening 60, 62, one on the inlet side and one on the outlet side.

Basic body 54 is formed slightly arc-shaped corresponding to the geometry of the flow channel between blades 4, 6 or between their blade surfaces 8, 10, respectively, and extends over a large area between blade surfaces 8, 10, so that it forms an essentially planar shroud inner surface 32 with a surface facing away from inner peripheral surfaces 56, 58 of shrouds 14, 16. It has two opposite lateral V-shaped recesses 64, 66 for engaging with raised material pieces 60, 62.

According to the view in FIG. 3, crosspiece 18 extends from basic body 54 and on the ends transforms into two triangular-shaped end sections 20, 22, which are formed as material thickenings of basic body 54. End sections 20, 22 are aligned opposite to one another and each of these with their force-transmission surfaces 28, 30 bounds a damping gap 12a, 12b between shrouds 14, 16. Damping gaps 12a, 12b are formed in particular between force-transmission surfaces 28, 30 of coupling element 52 and opposite-lying force-transmission surfaces 38 of the left shroud 14 or of force-transmission surface 40 of the right shroud 16, respectively. At least during operation, damping gaps 12a, 12b are closed by running together the opposite-lying force-transmission surfaces 28, 30 or 38, 40, respectively, and thus shrouds 14, 16 or blades 4, 6 are clamped together.

In this case, force-transmission surfaces 38, 40 of shrouds 14, 16 and thus force-transmission surfaces 28, 30 of coupling element 2 are each oriented opposite one another.

On the side of the outer periphery, crosspiece 18 with end segments 20, 22 has a contour whose course is adapted to adjacent outer peripheral surfaces 68, 70 of shrouds 14, 16, so that essentially a consistent or integrated outer contour is formed. Accordingly, each of the end sections has a wall-type raised piece 72, 74, which produces a connection between opposite-lying inlet-side sealing strips 48, 76 or outlet-side sealing strips 50, 78, respectively, of shrouds 14, 16, and corresponds to these sealing strips 48, 50, 76, 78 in its configuration.

A coupling element 2, 52 is disclosed for the arrangement between shrouds 14, 16 of adjacent rotor blades 4, 6, wherein it has force-transmission surfaces 28, 30 for bounding damping gaps 12a, 12b between shrouds 14, 16, and also disclosed is a rotor with at least one coupling element 2, 52 of this type.

The invention claimed is:

1. A coupling element (2; 52) for mechanically coupling adjacent blades of a rotor blade ring, which can be positioned between shrouds (14, 16), wherein the coupling element (2; 52) has force-transmission surfaces (28, 30) for defining damping gaps (12a, 12b) between shrouds (14, 16), wherein the coupling element is separately formed from the shrouds, and wherein the coupling element has a first end and a second end, and the coupling element is dimensioned and configured to be positioned such that the first end is adjacent a first axial edge of a respective shroud and the second end is adjacent a second axial edge of the respective shroud;

wherein, in an incorporated state, the coupling element continues the annular spatial geometry of a flow channel.

2. The coupling element according to claim 1, wherein the coupling element has a first force-transmission surface and a second force-transmission surface, wherein the first force-transmission surface is formed on the first end and the second force-transmission surface is formed on the second end.

3. The coupling element according to claim 2, further comprising:
a body section (18) with a narrowed section between its force-transmission surfaces (28, 30).

4. The coupling element according to claim 1, wherein the coupling element is formed at least with one section corresponding to the course of opposite-lying shroud sides (15, 17).

5. The coupling element according to claim 4, wherein its force-transmission surfaces (28, 30) point in a common direction or in a direction opposite to one another.

6. The coupling element according to claim 1, wherein, in an incorporated state, the coupling element forms a substantially uniform outer contour of shrouds (14, 16).

7. The coupling element according to claim 1, further comprising:
a body section for a form-fitting engagement with at least one of shrouds (14, 16).

8. The coupling element according to claim 1, wherein the coupling element can be assembled as a module from a plurality of individual elements.

9. A rotor, comprising:
at least one blade ring that has a plurality of blades (4, 6);
a shroud (14, 16) secured to a tip of each blade;
a plurality of coupling elements (2, 52) separately formed from the shrouds, each coupling element positioned between a pair of shrouds on a respective pair of adjacent blades, wherein each coupling element clamps the respective shrouds to one another;
the coupling elements (2, 52) having force-transmission surfaces (28, 30) for defining a damping gap (12) between shrouds (14, 16);
wherein, in an incorporated state, each coupling element continues the annular spatial geometry of a flow channel.

10. The rotor according to claim 9, wherein coupling elements (2; 52) in a rest position define a slot (46) between force-transmission surfaces (38, 40) of shrouds (14, 16).

11. The rotor according to claim 9, wherein each of coupling elements (2) are joined cohesively with one of the shrouds (14).

12. The rotor according to claim 9, wherein coupling elements (52) are disposed in a form-fitting manner between the shrouds (14, 16).

13. A coupling element (2; 52) for mechanically coupling adjacent blades of a rotor blade ring, which can be positioned between shrouds (14, 16), wherein the coupling element (2; 52) has force-transmission surfaces (28, 30) for defining damping gaps (12a, 12b) between shrouds (14, 16),
wherein the coupling element is separately formed from the shrouds, and
wherein the coupling element has a first end and a second end, and the coupling element is dimensioned and configured to be positioned such that the first end is adjacent a first axial edge of a respective shroud and the second end is adjacent a second axial edge of the respective shroud;
wherein, in an incorporated state, the coupling element forms a substantially uniform outer contour of shrouds (14, 16).

14. The coupling element according to claim 13, wherein the coupling element has a first force-transmission surface and a second force-transmission surface, wherein the first force-transmission surface is formed on the first end and the second force-transmission surface is formed on the second end.

15. The coupling element according to claim 14, further comprising:
a body section (18) with a narrowed section between its force-transmission surfaces (28, 30).

16. The coupling element according to claim 13, wherein the coupling element is formed at least with one section corresponding to the course of opposite-lying shroud sides (15, 17).

17. The coupling element according to claim 16, wherein its force-transmission surfaces (28, 30) point in a common direction or in a direction opposite to one another.

18. The coupling element according to claim 13, further comprising:
a body section for a form-fitting engagement with at least one of shrouds (14, 16).

19. The coupling element according to claim 13, wherein the coupling element can be assembled as a module from a plurality of individual elements.

20. A rotor, comprising:
at least one blade ring that has a plurality of blades (4, 6);
a shroud (14, 16) secured to a tip of each blade;
a plurality of coupling elements (2, 52) separately formed from the shrouds, each coupling element positioned between a pair of shrouds on a respective pair of adjacent blades, wherein each coupling element clamps the respective shrouds to one another;
the coupling elements (2, 52) having force-transmission surfaces (28, 30) for defining a damping gap (12) between shrouds (14, 16);
wherein, in an incorporated state, the coupling element forms a substantially uniform outer contour of shrouds (14, 16).

21. The rotor according to claim 20, wherein coupling elements (2; 52) in a rest position define a slot (46) between force-transmission surfaces (38, 40) of shrouds (14, 16).

22. The rotor according to claim 20, wherein each of coupling elements (2) are joined cohesively with one of the shrouds (14).

23. The rotor according to claim 20, wherein coupling elements (52) are disposed in a form-fitting manner between the shrouds (14, 16).

* * * * *